United States Patent
Hammer et al.

(10) Patent No.: US 10,532,718 B2
(45) Date of Patent: Jan. 14, 2020

(54) BUMPER ASSEMBLIES INCLUDING DEFORMABLE UPPER ENERGY ABSORBERS

(71) Applicant: TOYOTA MOTOR ENGINEERING & MANUFACTURING NORTH AMERICA, INC., Erlanger, KY (US)

(72) Inventors: Jeremiah T. Hammer, Ann Arbor, MI (US); Aaron R. Steinhilb, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 240 days.

(21) Appl. No.: 15/598,587

(22) Filed: May 18, 2017

(65) Prior Publication Data
US 2018/0334132 A1 Nov. 22, 2018

(51) Int. Cl.
| B60R 21/38 | (2011.01) |
| B60R 21/34 | (2011.01) |
| B60R 19/22 | (2006.01) |
| B60R 19/48 | (2006.01) |

(52) U.S. Cl.
CPC .............. B60R 21/34 (2013.01); B60R 19/22 (2013.01); B60R 19/483 (2013.01); *B60R 2021/346* (2013.01)

(58) Field of Classification Search
CPC ....... B60R 21/34; B60R 19/22; B60R 19/483; B60R 19/52; B60R 19/18; B60R 2021/346; B60R 2021/343; B60R 2019/1873; B60R 2019/525
USPC .................. 293/120, 121, 132, 136; 180/274
See application file for complete search history.

(56) References Cited

U.S. PATENT DOCUMENTS

| 5,290,078 | A | * | 3/1994 | Bayer | B60R 19/18 |
| | | | | | 267/139 |
| 6,089,628 | A | * | 7/2000 | Schuster | B60R 19/12 |
| | | | | | 293/118 |
| 6,923,494 | B2 | | 8/2005 | Shuler et al. | |
| 6,983,964 | B2 | * | 1/2006 | Murata | B60R 19/18 |
| | | | | | 293/109 |
| 8,424,629 | B2 | | 4/2013 | Ralston et al. | |
| 9,132,794 | B2 | | 9/2015 | Nagaya et al. | |
| 9,821,754 | B2 | * | 11/2017 | Farooq | B60R 19/12 |
| 9,932,004 | B1 | * | 4/2018 | Mihm | B60R 19/18 |
| 2002/0149214 | A1 | * | 10/2002 | Evans | B60R 19/18 |
| | | | | | 293/120 |
| 2002/0180224 | A1 | | 12/2002 | Mansoor et al. | |
| 2003/0189343 | A1 | * | 10/2003 | Evans | B60R 19/18 |
| | | | | | 293/120 |
| 2005/0046206 | A1 | * | 3/2005 | Ohno | B60R 19/18 |
| | | | | | 293/120 |

(Continued)

FOREIGN PATENT DOCUMENTS

JP  2005297726 A  10/2005

*Primary Examiner* — Toan C To
(74) *Attorney, Agent, or Firm* — Dinsmore & Shohl LLP

(57) ABSTRACT

A vehicle includes a bumper assembly including a bumper reinforcement beam extending generally in a vehicle lateral direction. A bumper beam contact component is located above the bumper reinforcement beam in a vehicle vertical direction. An upper energy absorbing structure is located at a top surface of the bumper reinforcement beam and between the bumper beam contact component and the bumper reinforcement beam.

18 Claims, 10 Drawing Sheets

(56) References Cited

U.S. PATENT DOCUMENTS

2007/0046043 A1\* 3/2007 Ito .......................... B60R 19/18
 293/120
2007/0182172 A1 8/2007 Hasegawa \* cited by examiner

BUMPER ASSEMBLIES INCLUDING DEFORMABLE UPPER ENERGY ABSORBERS

TECHNICAL FIELD

The present specification generally relates to bumper assemblies and vehicles that include bumper assemblies, and more specifically, bumper assemblies that include a deformable upper energy absorber.

BACKGROUND

Vehicles may be equipped with bumper assemblies and impact protection structures that elastically and plastically deform to absorb energy in the event of an impact. A number of standards and tests currently exist. Various organizations are introducing a number of pedestrian regulations and rating criteria for automotive vehicles. As one example, test methods have been developed to assess the protection of an adult pedestrian by simulating leg-impact conditions during a car-to-pedestrian impact. Such criteria can affect the rigidity or feel of the bumper assemblies.

Current vehicles are now receiving sensor assemblies located at a front of the vehicle, such as those used for impact sensing and/or cruise control. The sensor assemblies may include a relatively hard housing that can provide contact locations during impact testing. Further, the sensor assemblies may be located in proximity to bumper beam reinforcements, which can also provide a contact location. When the sensor assemblies come into contact with the bumper beam reinforcements during an impact test, a stroke of a leg impactor into a front of the vehicle may be shortened resulting in a spike in leg impactor deceleration values.

Accordingly, bumper assemblies are desired that provide controlled energy absorption under pedestrian leg impact testing conditions where a sensor assembly or other bumper beam contact component moves toward and may engage the bumper beam reinforcement under pedestrian leg impact testing conditions.

SUMMARY

In one embodiment, a vehicle includes a bumper assembly including a bumper reinforcement beam extending generally in a vehicle lateral direction. A bumper beam contact component is located above the bumper reinforcement beam in a vehicle vertical direction. An upper energy absorbing structure is located at a top surface of the bumper reinforcement beam and between the bumper beam contact component and the bumper reinforcement beam.

In another embodiment, a multi-component bumper energy absorber includes a front bumper energy absorber that connects to a front face of a bumper reinforcement beam and extends along the front face in a vehicle lateral direction. An upper energy absorbing structure is connected to the front bumper energy absorber. The upper energy absorbing structure rests on an upper surface of the bumper reinforcement beam.

In another embodiment, a method of absorbing energy as a bumper reinforcement beam contact component moves toward a bumper reinforcement beam during a pedestrian leg impact test is provided. The method includes providing a hollow cavity in an upper energy absorbing structure that extends between a front side and a rear side of the upper energy absorber. The upper energy absorbing structure is located at an upper surface of the bumper reinforcement beam and between the bumper reinforcement beam and the bumper reinforcement beam contact component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a bumper assembly at a front end of the vehicles where the bumper assembly includes a bumper reinforcement beam extending in a vehicle lateral direction. The bumper reinforcement beam is connected to side members of a vehicle frame that extend in a vehicle longitudinal direction. A bumper reinforcement beam contact component, such as a sensor assembly is located at the front end assembly and is located above the bumper reinforcement beam. Located between the bumper reinforcement beam and the bumper reinforcement beam contact component is an upper energy absorbing structure that is relatively soft compared to the bumper reinforcement beam contact component and the bumper reinforcement beam. The upper energy absorbing structure deforms as the bumper reinforcement beam contact component approaches the bumper reinforcement beam under pedestrian leg impact testing conditions. The upper energy absorbing structure may be a single, monolithic structure that is shaped to buckle rather than stack up or compress, which can provide additional energy absorption characteristics, as will be described in greater detail below.

Figure 1:
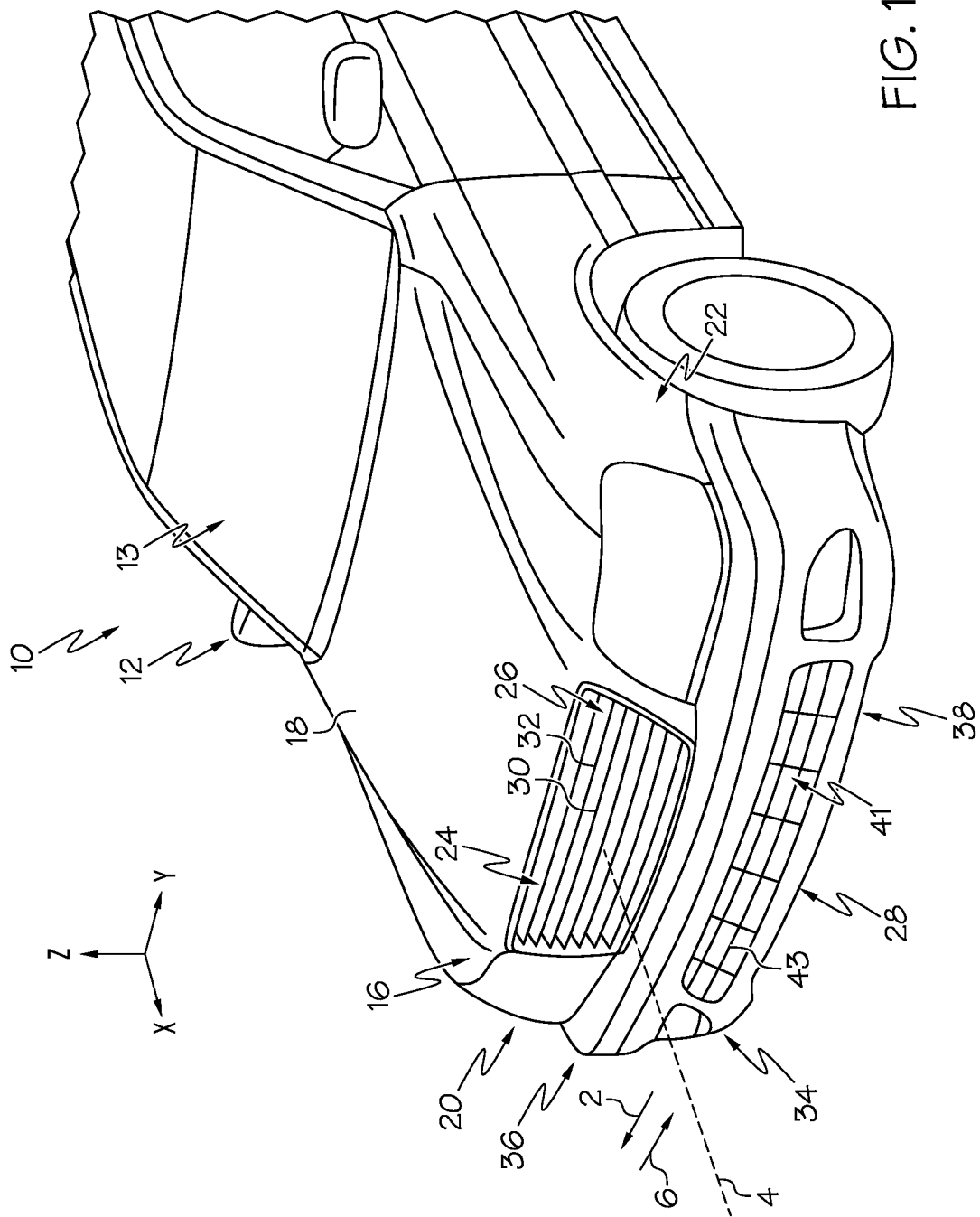
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Referring initially to FIG. 1, a vehicle 10 is depicted. The vehicle 10 includes a vehicle body 12 onto which a vehicle drivetrain is coupled. The vehicle 10 also includes a cabin 13 that is integral with the vehicle body 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the upper grille assembly 24 includes a covering portion 30 with a number of grille deflectors 32, a mesh or other suitable covering that protects a radiator behind the covering portion 30, while allowing air to flow past the covering and over the radiator. The front end assembly 16 includes an outer covering or front fascia 34, an upper projecting bumper portion 36 and a lower projecting bumper portion 38 that under hangs the upper projecting bumper portion 36. The lower grille assembly 28 may include a covering portion 41 with a number of grille deflectors 43 and be located between the upper projecting bumper portion 36 and the lower projecting bumper portion 38.

Figure 2:
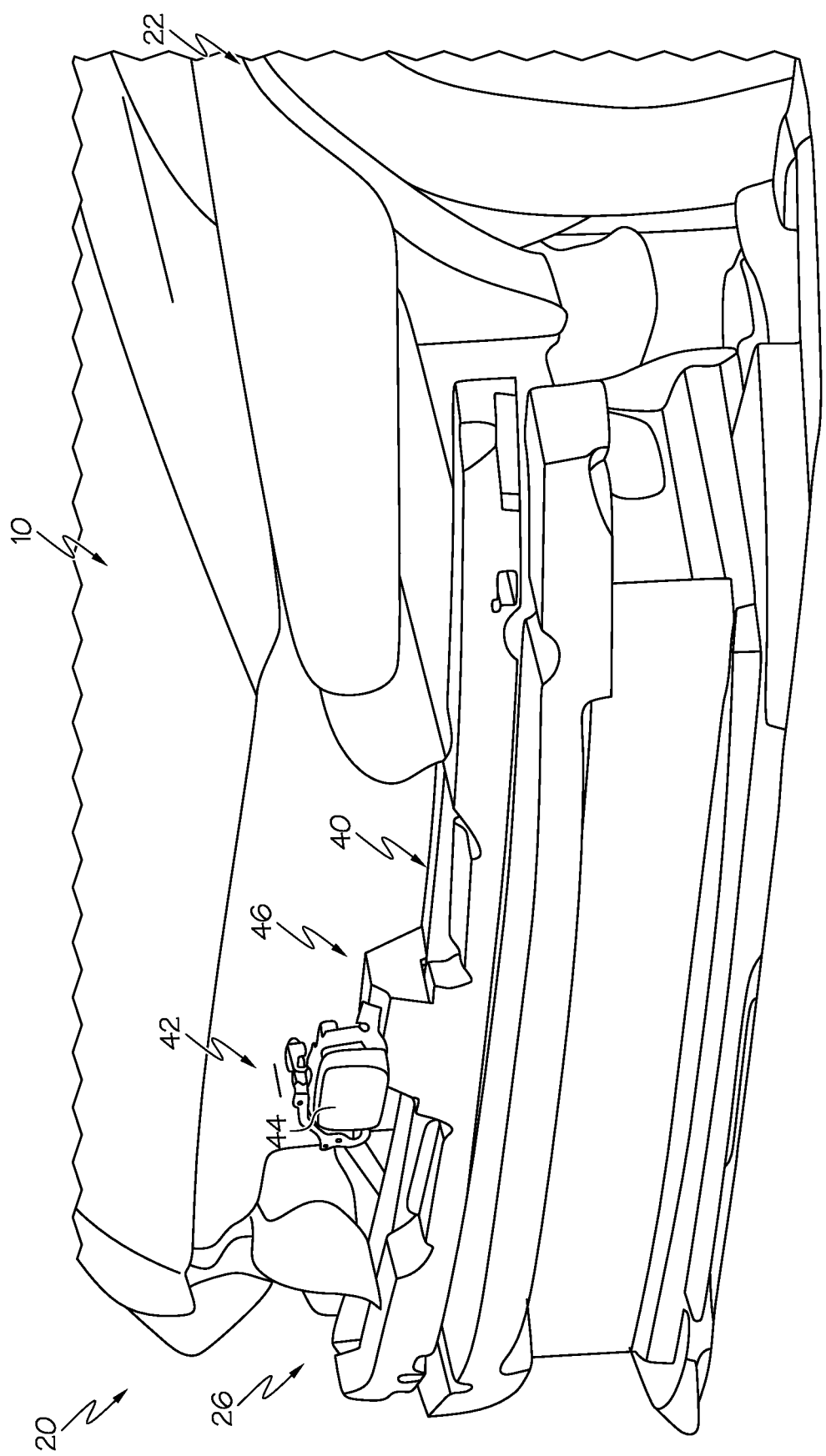
FIG. 2 illustrates a front, perspective view of a bumper assembly of the vehicle of FIG. 1 according to one or more embodiments shown or described herein.

Referring to FIG. 2, the vehicle 10 is shown with the front fascia 34 and covering portion 30 removed. The vehicle 10 includes a bumper reinforcement beam 40 that extends generally in the vehicle lateral direction between the front fenders 20 and 22. Located above the bumper reinforcement beam 40 is a bumper reinforcement beam contact component 42. In this embodiment, the bumper reinforcement beam contact component 42 is a sensor assembly that can be used for object detection and/or dynamic cruise control as examples. The bumper reinforcement beam contact component 42 includes a housing 44 that may be formed of a hard material, such as a hard plastic or metal. An upper energy absorbing structure 46 is located between the bumper reinforcement beam 40 and the bumper reinforcement beam contact component 42.

Figure 3:
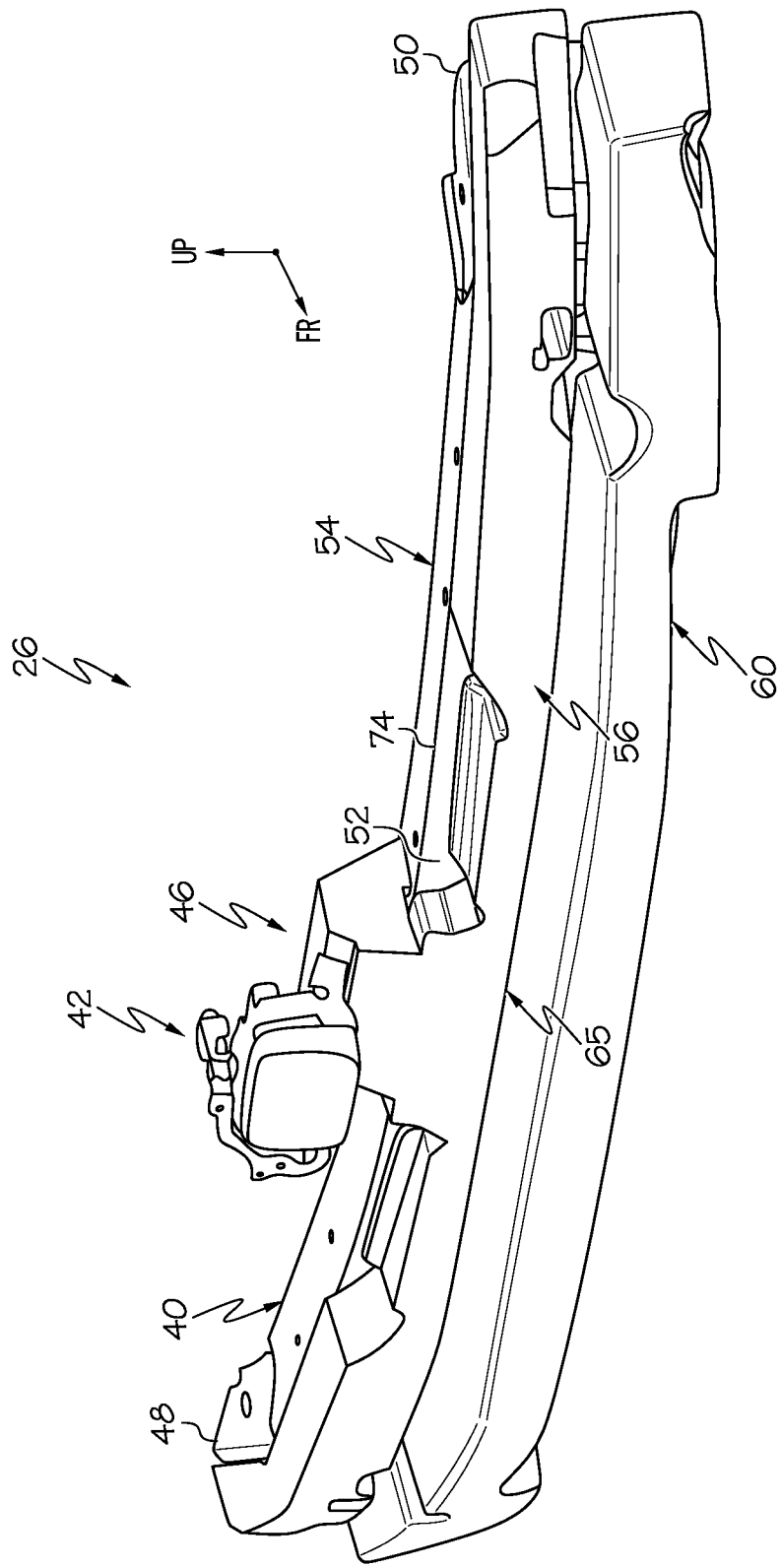
FIG. 3 illustrates a front, perspective view of the bumper assembly of FIG. 2 in isolation according to one or more embodiments shown and described herein.

FIG. 3 illustrates the front bumper assembly 26 in isolation with the bumper reinforcement beam contact component 42. The front bumper assembly 26 includes the bumper reinforcement beam 40 that extends horizontally in the vehicle lateral direction. The bumper reinforcement beam 40 includes opposite ends 48 and 50, front face 52 and rear face 54. Mounted at the front face 52 of the bumper reinforcement beam 40 is a front bumper energy absorber 56. The front bumper energy absorber 56 extends along a length of the bumper reinforcement beam 40. In some embodiments, the front bumper energy absorber 56 may extend along an entire length of the bumper reinforcement beam 40, between the opposite ends 48 and 50.

The front bumper energy absorber 56 may be formed of a material that is softer than a material forming the bumper reinforcement beam 40, such as a foam or rubber. A suitable foam material is an expanded polypropylene. Expanded polypropylene (EPP) is a closed-cell bead foam that has energy absorption properties, multiple impact resistance, thermal insulation, buoyancy, water and chemical resistance, high strength to weight ratio and recyclability. EPP can be made in a wide range of densities, such as from 15 to 200 grams per liter. The front bumper energy absorber 56 may be used to absorb energy from, for example a low speed impact.

A lower energy absorber 60 is located below the front bumper energy absorber 56 and also extends along the length of the bumper reinforcement beam 40. The lower energy absorber 60 may be formed of a material that is the same or different than the material forming the front bumper energy absorber 56. The lower energy absorber 60 extends forward in the vehicle longitudinal direction to engage a lower portion of a leg impactor during leg impact testing to reduce a measured bending moment on the leg impactor.

The upper energy absorbing structure 46 is located between the bumper reinforcement beam 40 and the bumper reinforcement beam contact component 42 and may be connected to the front bumper energy absorber 56 forming a multi-component energy absorber 65. In the illustrated embodiment, the upper energy absorbing structure 46 is formed integrally with the front bumper energy absorber 56 and may be formed of the same material as the front bumper energy absorber 56. For example, the upper energy absorbing structure 46 and the front bumper energy absorber 56 may be formed by a molded EPP material.

Figure 4:
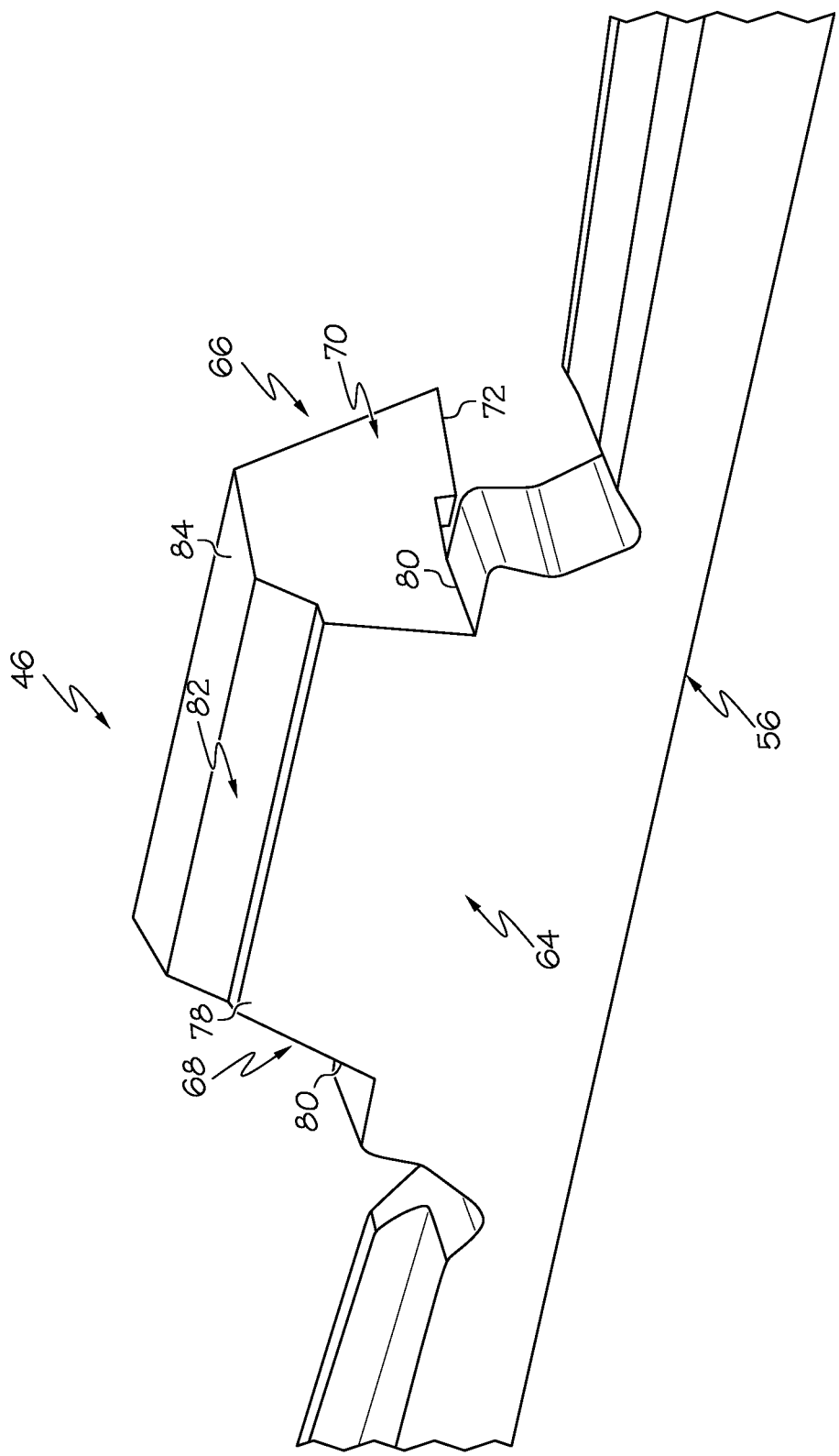
FIG. 4 illustrates a front, perspective view of an upper energy absorbing structure of the bumper assembly of FIG. 3 according to one or more embodiments shown and described herein.

Referring to FIG. 4, the upper energy absorbing structure 46 includes a front side 64, a rear side 66 and side walls 68 and 70 that extend between the front side 64 and the rear side 66, forming a box-shaped structure. The upper energy absorbing structure 46 is connected directly to the front bumper energy absorber 56 at the front side 64 extending outwardly from the front bumper energy absorber 56 to overhang the bumper reinforcement beam 40 (FIG. 3). The side walls 68 and 70 can provide a base structure 72 that rests on an upper surface 74 of the bumper reinforcement beam 40. In some embodiments, the base structure 72 may freely rest on the bumper reinforcement beam 40 without being directly connected thereto.

The front side 64 of the upper energy absorbing structure 46 may be closed by a front wall 78 that is integrally formed with the front bumper energy absorber 56. Forward portions 80 of the side walls 68 and 70 may also be integrally formed with the front bumper energy absorber 56. A notch or catch structure 82 may connect the front wall 78 and a top wall 84. The catch structure 82 can be arranged to provide greater surface contact with the bumper reinforcement beam contact component 42 as the bumper reinforcement beam contact component 42 moves toward the bumper reinforcement beam 40 during a pedestrian leg impact test.

Figure 5:
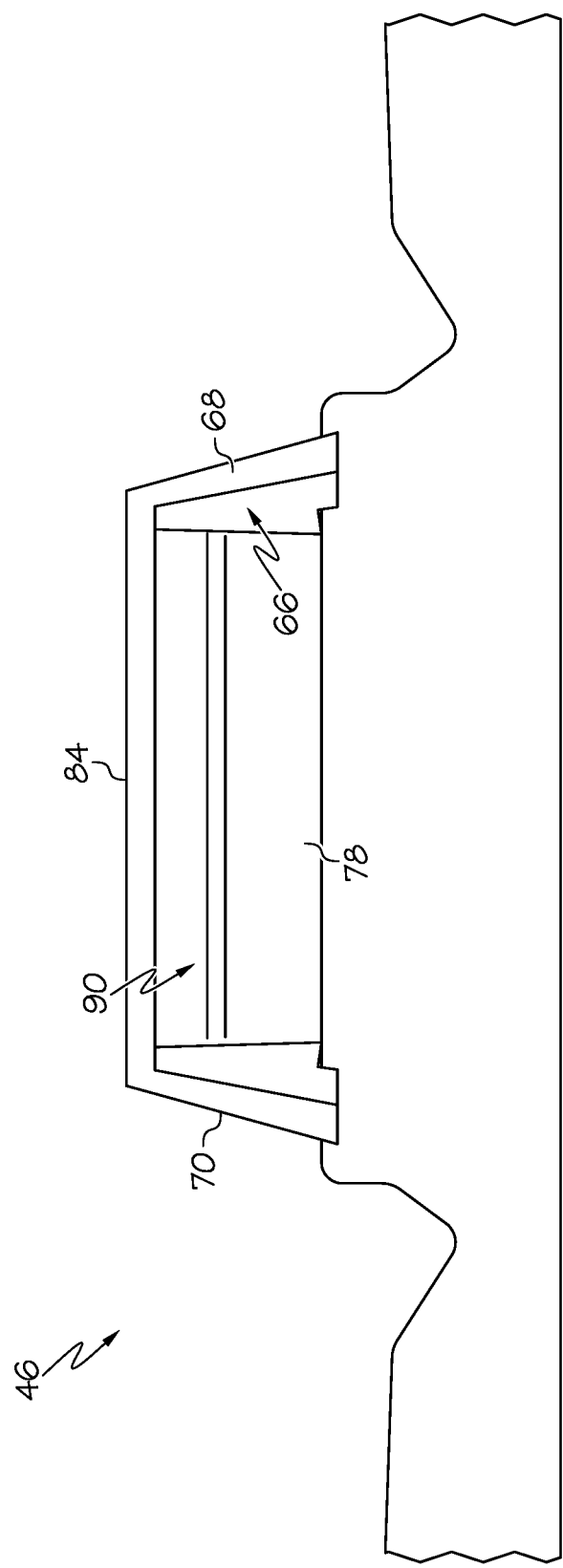
FIG. 5 illustrates a rear view of the upper energy absorbing structure of FIG. 4 according to one or more embodiments shown and described herein.

Referring now to FIG. 5, the rear side 66 of the upper energy absorbing structure 46 is illustrated. As can be seen, the rear side 66 may be open with the side walls 68 and 70, top wall 84 and front wall 78 forming a hollow cavity 90. As will be described below, providing the upper energy absorbing structure 46 with a hollow cavity 90 can facilitate deformation of the upper energy absorbing structure 46, which can improve energy absorption compared to a solid energy absorbing structure without the hollow cavity.

Figure 6:
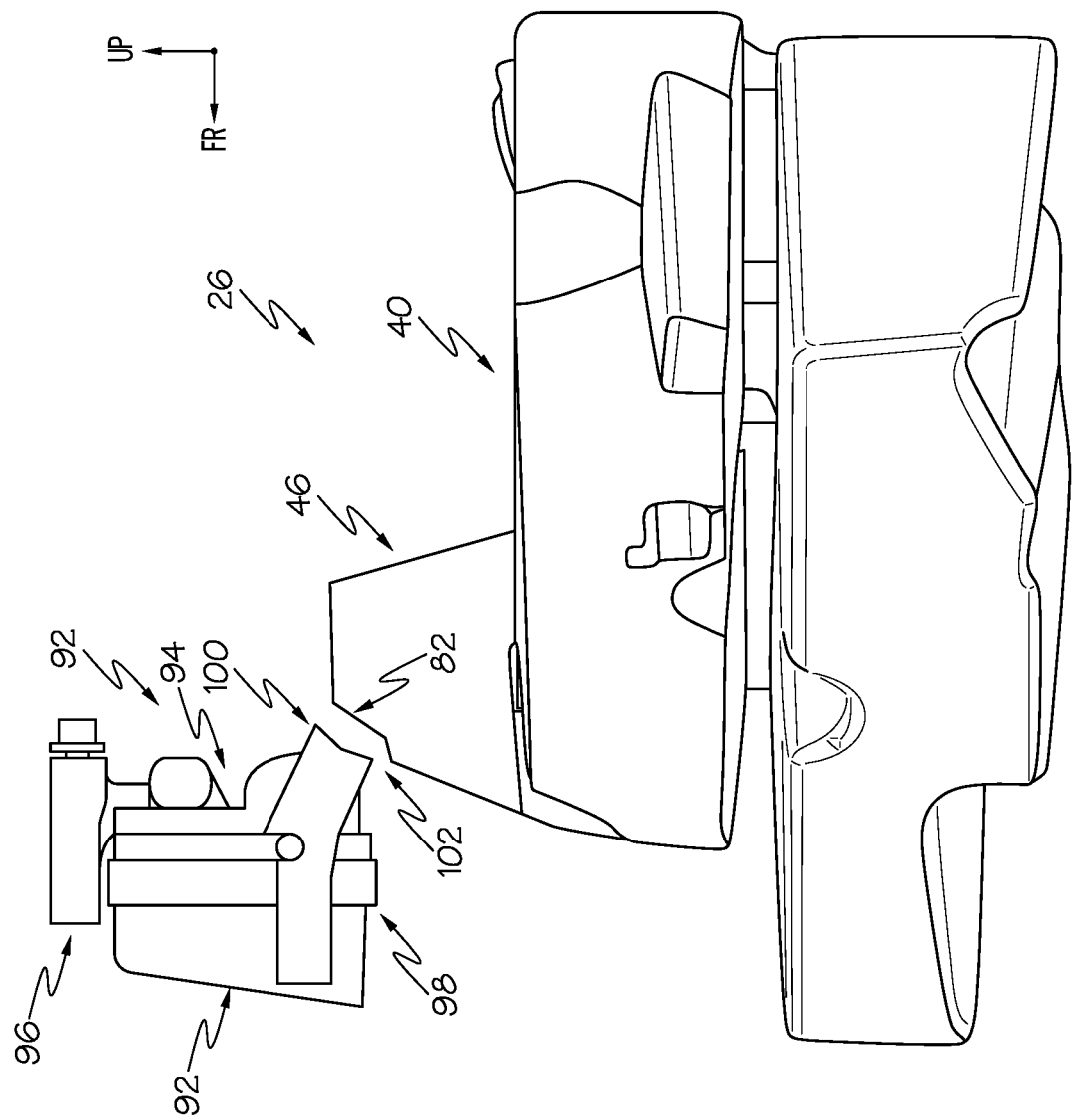
FIG. 6 illustrates a side view of the bumper assembly of FIG. 3 along with a bumper reinforcement beam contact component according to one or more embodiments shown and described herein.

Referring to FIG. 6, a side view of the front bumper assembly 26 is illustrated showing the positional relationship between the bumper reinforcement beam contact component 42 and the upper energy absorbing structure 46. The bumper reinforcement beam contact component 42 includes a front side 92, a rear side 94, a top side 96 and a bottom side 98. A bottom edge portion 100 of the bumper reinforcement beam contact component 42 is aligned with the catch structure 82 forming a pocket that receives the bumper reinforcement beam contact component 42 as the bumper reinforcement beam contact component 42 moves toward the bumper reinforcement beam 40. In the original configuration, a gap 102 is provided between the bumper reinforcement beam contact component 42 and the upper energy absorbing structure 46.

Figure 7:
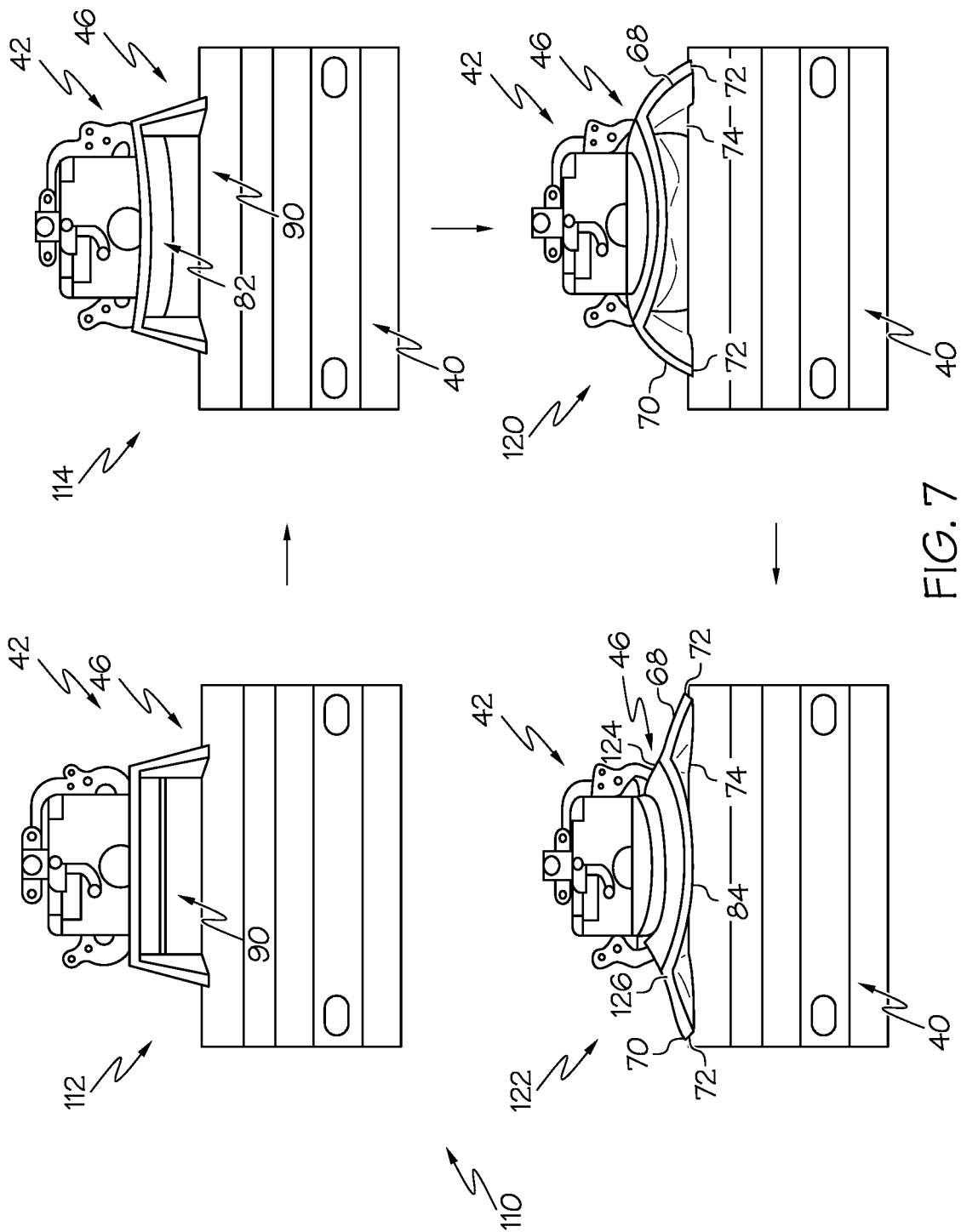
FIG. 7 illustrates a method of absorbing energy as the bumper reinforcement beam contact component of FIG. 4 moves into engagement with the bumper reinforcement beam of FIG. 4 during a pedestrian leg impact test according to one or more embodiments shown and described herein.
Figure 8:
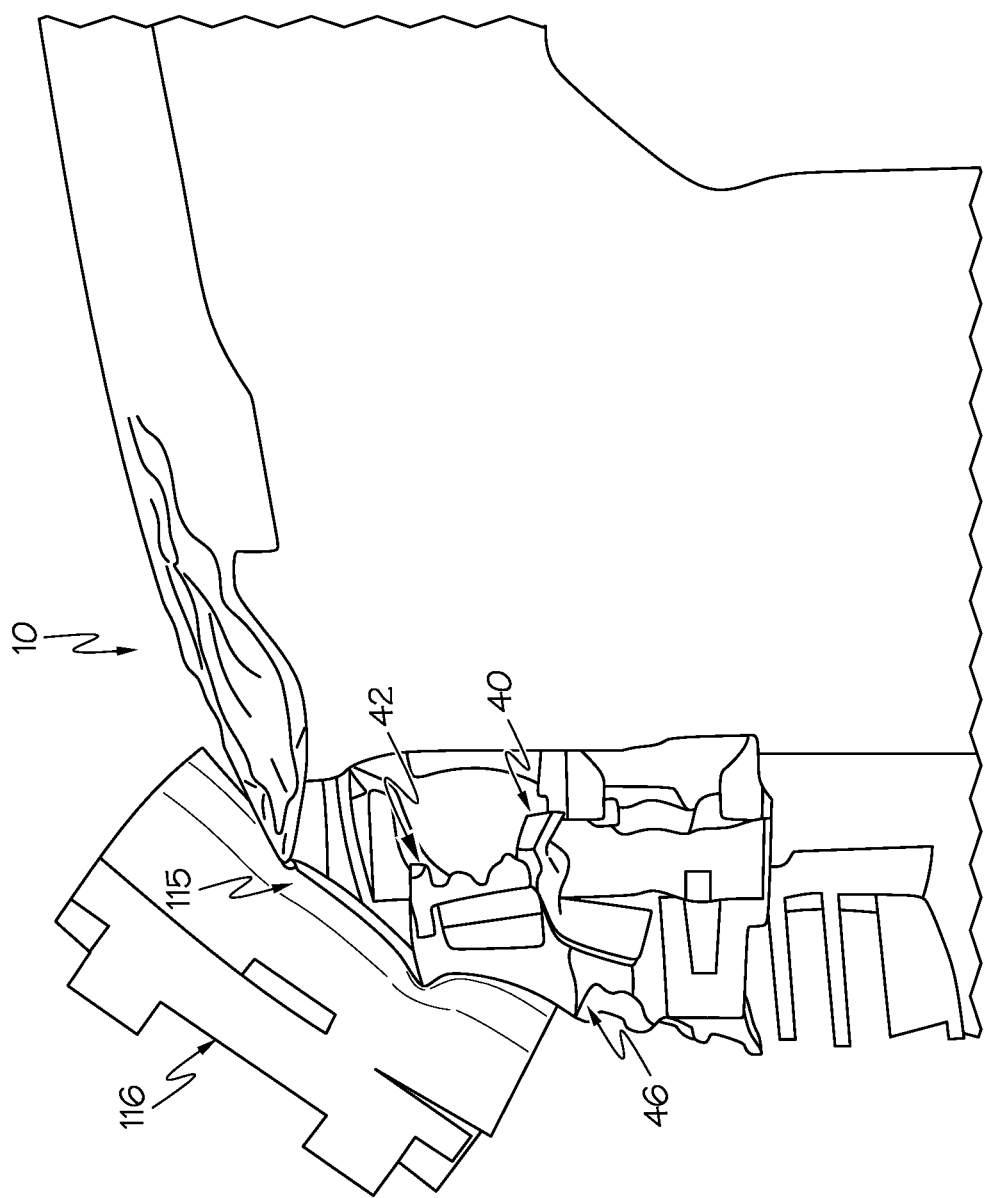
FIG. 8 illustrates a leg impactor and hood edge area of the vehicle of FIG. 1 during a pedestrian leg impact test according to one or more embodiments shown and described herein.

Referring to FIG. 7, a method 110 of absorbing energy as the bumper reinforcement beam contact component 42 moves into engagement with the bumper reinforcement beam 40 during a pedestrian leg impact test is illustrated. At step 112, the bumper reinforcement beam contact component 42 and upper energy absorbing structure 46 are illustrated in their original, undeflected positions. The upper energy absorbing structure 46 is provided with the hollow cavity 90 that extends between the front side and the rear side. At step 114, the bumper reinforcement beam contact component 42 moves toward the bumper reinforcement beam 40 in response to a leg impactor impinging upon a hood edge area 115 of the vehicle 10. FIG. 8 illustrates the leg impactor 116 and hood edge area 118 during a pedestrian leg impact test. As can be seen, the bumper reinforcement beam contact component 42 is received by the catch structure 82 that provides a recess to receive the bumper reinforcement beam contact component 42. Such a catch structure 82 can provide for a more reliable engagement between the bumper reinforcement beam contact component 42 and the upper energy absorbing structure 46 compared to, for example, a single square edge.

Referring still to FIG. 7, at step 120, movement of the bumper reinforcement beam contact component 42 toward the bumper reinforcement beam 40 continues to deform the upper energy absorbing structure 46, while the upper energy absorbing structure 46 absorbs impact energy from the bumper reinforcement beam contact component 42. As can be seen, the side walls 68 and 70 including their base structure 72 move outwardly in the vehicle lateral direction relative to the bumper reinforcement beam 40. As mentioned above, this is because the side walls 68 and 70 are not directly affixed to the upper surface 74 of the bumper reinforcement beam 40, but, instead, can slide relative thereto thereby increasing a lateral distance between the side walls 68 and 70. At step 122, the bumper reinforcement beam contact component 42 continues to move toward the bumper reinforcement beam 40, which causes further deformation of the upper energy absorbing structure 46. The side walls 68 and 70 of the upper energy absorbing structure 46 continue to move laterally outboard away from one another, buckling at top edges 124 and 126 where the side walls 68 and 70 and the top wall 84 meet.

Figure 9:
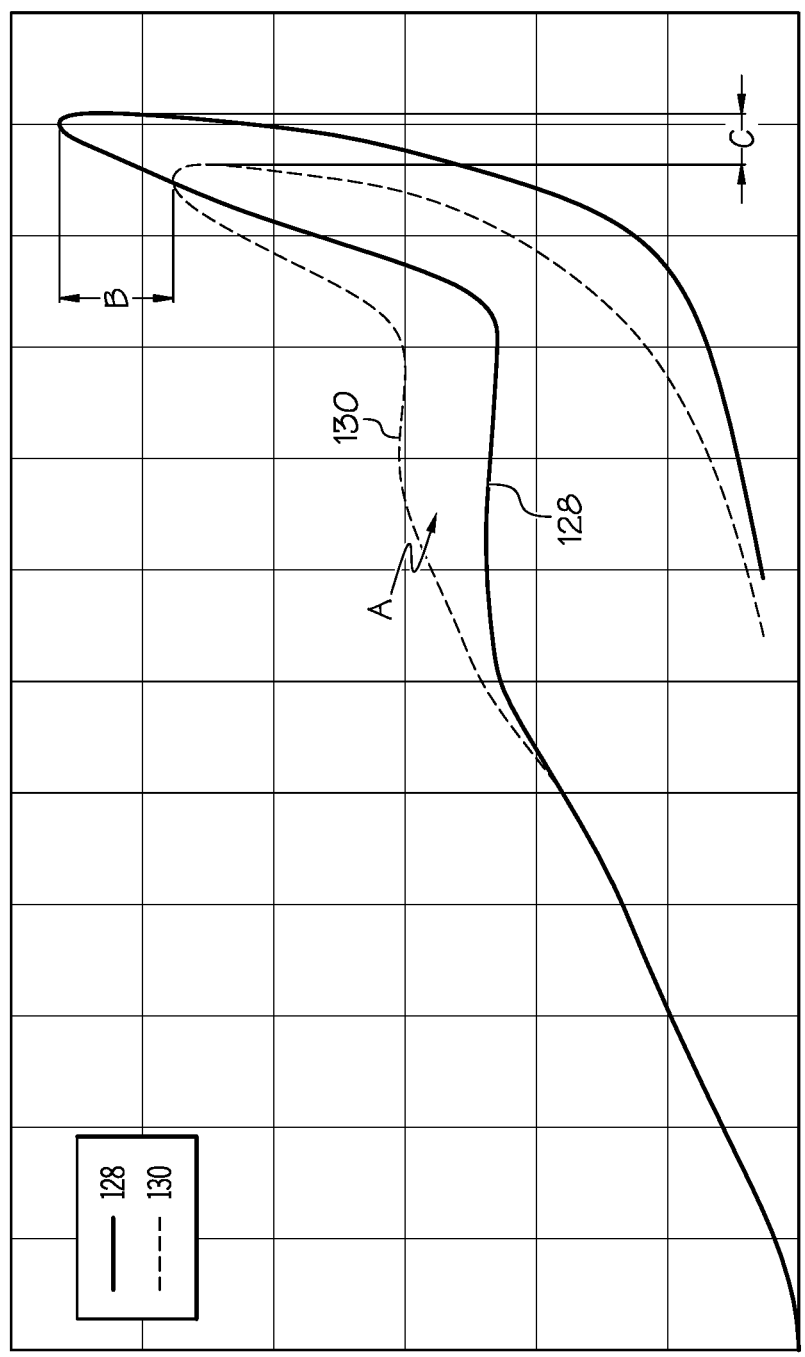
FIG. 9 is a graphical representation of operation of the energy absorbing structure of FIG. 4 is illustrated compared to a baseline case where no energy absorbing structure is present during a pedestrian leg impact test according to one or more embodiments shown and described herein.

Referring to FIG. 9, a graphical representation of operation of the energy absorbing structure is illustrated compared to a baseline case where no energy absorbing structure is present during a pedestrian leg impact test. A suitable test procedure is provided by the EuroNCAP v8.2 Upper Legform to Bumper Test procedure. Solid line 128 represents the force versus stroke experienced by the pedestrian leg impactor during the baseline case where no energy absorbing structure is present. Dashed line 130 represents the force versus stroke experienced by the pedestrian leg impactor with the energy absorbing structure present. As represented by area A, use of the energy absorbing structure results in additional energy being absorbed earlier in the stroke of the pedestrian leg impactor compared to the baseline case with no energy absorbing structure present. The earlier absorption of additional energy by the energy absorbing structure causes a reduction of force at an end of the stroke of the pedestrian leg impactor, as represented by line B. Presence of the energy absorbing structure also reduces an overall stroke length of the pedestrian leg impactor, as represented by line C. However, presence of the hollow cavity of the energy absorbing member allows the stroke to more closely approach the baseline stroke length compared to a solid energy absorbing structure with no hollow cavity.

Figure 10:
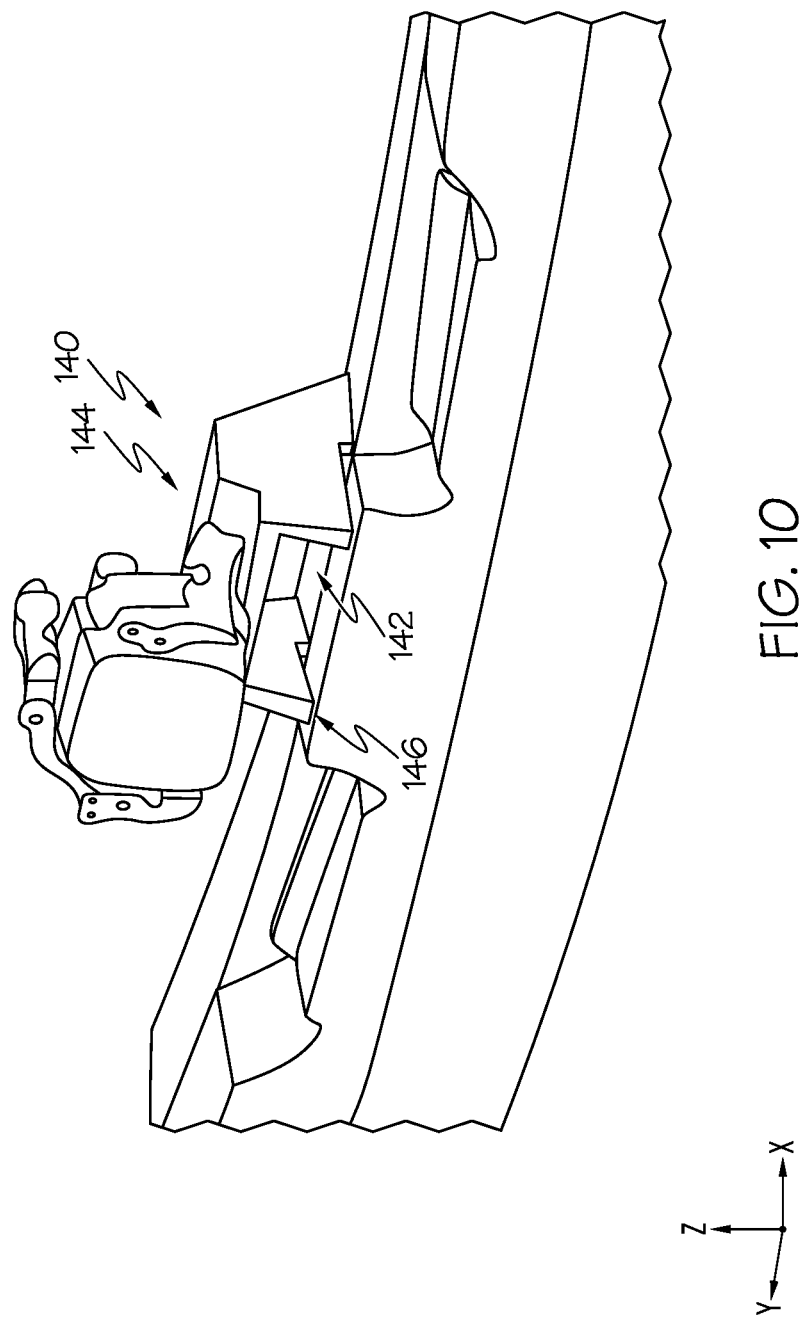
FIG. 10 depicts a side, perspective view of another embodiment of an upper energy absorbing structure according to one or more embodiments shown and described herein.

Referring to FIG. 10, another embodiment of an energy absorbing structure 140 includes features that are similar to the upper energy absorbing structure 46 described above, but eliminates the front wall thereby providing a hollow opening or cavity 142 that extends entirely through the energy absorbing structure 140 from a rear side 144 to a front side 146. Such an arrangement can further increase overall stroke of the pedestrian leg impactor closer to the baseline case of FIG. 9, while reducing force at the end of the stroke.

The above-described upper energy absorbing structures are used to absorb energy from a pedestrian leg impactor during pedestrian leg impact testing. The upper energy absorbing structures are located between a relatively hard bumper reinforcement beam contact component, such as a radar or other sensor, and a relatively hard bumper reinforcement beam. During the pedestrian leg impact testing, the bumper reinforcement beam contact component may move toward the bumper reinforcement beam as the front end assembly deforms due to contact with the pedestrian leg impactor. As the bumper reinforcement beam contact component moves toward the bumper reinforcement beam, the bumper reinforcement beam contact component engages the upper energy absorbing structures, which then controllably deform thereby absorbing energy before the bumper reinforcement beam contact component engages the bumper reinforcement beam.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle including a bumper assembly, comprising:
   a bumper reinforcement beam extending generally in a vehicle lateral direction;
   a sensor assembly located above the bumper reinforcement beam in a vehicle vertical direction; and
   an upper energy absorbing structure located at a top surface of the bumper reinforcement beam and between the sensor assembly and the bumper reinforcement beam.

2. The vehicle of claim 1, wherein the upper energy absorbing structure is located to receive the bumper beam contact component during an upper leg impact test.

3. The vehicle of claim 1, wherein the upper energy absorbing structure comprises a foam material.

4. The vehicle of claim 1, wherein the upper energy absorbing structure has a front side and a rear side, wherein a hollow cavity extends between the front side and the rear side.

5. The vehicle of claim 4, wherein the hollow cavity is open at the rear side of the upper energy absorbing structure.

6. The vehicle of claim 4, wherein the hollow cavity is open at both the front side and the rear side of the upper energy absorbing structure.

7. The vehicle of claim 1, wherein the upper energy absorbing structure has a front side, a top wall and a catch structure formed as a notch located between the front side and the top wall, the catch feature facing the bumper beam contact component.

8. The vehicle of claim 1 further comprising a front bumper energy absorber that is connected to a front face of the bumper reinforcement beam.

9. The vehicle of claim 8, wherein the upper energy absorbing structure is formed integrally with the front bumper energy absorber.

10. A multi-component bumper energy absorber comprising:
    a front bumper energy absorber that connects to a front face of a bumper reinforcement beam and extends along the front face in a vehicle lateral direction; and
    an upper energy absorbing structure that is connected to the front bumper energy absorber, the upper energy absorbing structure rests on an upper surface of the bumper reinforcement beam;
    wherein the upper energy absorbing structure has a front side and a rear side, wherein a hollow cavity extends between the front side and the rear side.

11. The multi-component bumper energy absorber of claim 10, wherein the front bumper energy absorber is formed integrally with the upper energy absorbing structure.

12. The multi-component bumper energy absorber of claim 11, wherein the front bumper energy absorber and the upper energy absorbing structure comprise a foam material.

13. The multi-component bumper energy absorber of claim 10, wherein the hollow cavity is open at the rear side of the upper energy absorbing structure.

14. The multi-component bumper energy absorber of claim 10, wherein the hollow cavity is open at both the front side and the rear side of the upper energy absorbing structure.

15. The multi-component bumper energy structure of claim 10, wherein the upper energy absorbing structure has a front side, a top wall and a catch structure formed as a notch located between the front side and the top wall, the catch feature faces a bumper beam contact component.

16. A method of absorbing energy as a bumper reinforcement beam contact component moves toward a bumper reinforcement beam during a pedestrian leg impact test, the method comprising:
    providing a hollow cavity in an upper energy absorbing structure that extends between a front side and a rear side of the upper energy absorber; and
    locating the upper energy absorbing structure at an upper surface of the bumper reinforcement beam and between the bumper reinforcement beam and the bumper reinforcement beam contact component.

17. The method of claim 16, wherein the hollow cavity is open at the rear side of the upper energy absorbing structure.

18. The method of claim 16, wherein the hollow cavity is open at both the front side and the rear side of the upper energy absorbing structure.

* * * * *